US 8,360,685 B1

(12) United States Patent
Whiteside et al.

(10) Patent No.: US 8,360,685 B1
(45) Date of Patent: Jan. 29, 2013

(54) AUTONOMOUS UNDERWATER PLOW AND METHOD OF USE

(75) Inventors: Steve Whiteside, San Diego, CA (US); Robert Lee, Descanso, CA (US); Ronald Skala, Murrieta, CA (US); Brian Shook, San Diego, CA (US); Paul Wade, Chula Vista, CA (US); Bret Thomson, San Diego, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 263 days.

(21) Appl. No.: 12/876,323

(22) Filed: Sep. 7, 2010

(51) Int. Cl.
*F16L 1/16* (2006.01)

(52) U.S. Cl. ...................................................... 405/160

(58) Field of Classification Search .......... 405/159–162, 405/164, 165, 180–183
See application file for complete search history.

(56) References Cited

U.S. PATENT DOCUMENTS

| 3,898,852 A | 8/1975 | Ezoe et al. |
| 4,069,679 A | 1/1978 | Manley, Jr. |
| 4,542,334 A * | 9/1985 | Nelson ........................... 324/662 |
| 4,892,443 A | 1/1990 | Kunze et al. |
| 2010/0008730 A1 * | 1/2010 | Valdy ............................. 405/169 |

FOREIGN PATENT DOCUMENTS

| DE | 3924463 A1 * | 1/1991 |
| FR | 2903541 A1 * | 1/2008 |

* cited by examiner

*Primary Examiner* — Frederick L Lagman
*Assistant Examiner* — Kyle Armstrong
(74) *Attorney, Agent, or Firm* — Arthur K. Samora; Kyle Eppele

(57) ABSTRACT

An autonomous underwater plow can include a frame, a plow assembly and a propulsion assembly. The plow assembly is fixed to the one end of the frame, while the propulsion assembly is pivotably attached to the other end. The propulsion assembly includes thrusters that are rigidly coupled to a float, and that provide a propulsion force perpendicular to the float buoyancy force. The plow sinks when placed in the water, but the float provides sufficient buoyancy so that the float end floats while the plow end is in contact with the ocean floor. This establishes a rake angle of between the frame and ocean floor. The plow requires less propulsion force for motion because part of the plow is floating, and requires less force to overcome obstacles on the ocean floor because the thrusters provides a constant horizontal propulsion force while the frame tilts to overcome the obstacle.

7 Claims, 8 Drawing Sheets

US 8,360,685 B1

AUTONOMOUS UNDERWATER PLOW AND METHOD OF USE

FEDERALLY-SPONSORED RESEARCH AND DEVELOPMENT

This invention (Navy Case No. 100313) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voice (619) 553-2778; email T2@spawar.navy.mil.

FIELD OF THE INVENTION

The present invention pertains generally to plows. More particularly, the present invention pertains to an autonomous underwater plow, which has a plow assembly that facilitates underwater deployment of sensor arrays on the ocean floor, without requiring the assistance of a support ship.

BACKGROUND OF THE INVENTION

Sometimes it is necessary to deploy a sensor cable array on the ocean floor, for any one of a number of reasons. In the past, sensor arrays have been primarily deployed by laying the array on the surface of the sea floor. This has usually been accomplished by paying the sensor cable array off the stern of a surface ship.

Surface deployments (deploying the cable on the ocean floor surface) are simpler to execute than buried deployments, but these deployments leave the sensors and connection cables extremely susceptible to damage from marine life. The cable array can also be vulnerable to fishing operations such as trawling, and boating operations where the vessel equipment is passed across the ocean floor. It may be advantageous to bury the array to minimize these risks. When underwater cables are buried, the operation typically requires the use of a large plow pulled by a surface craft. This type of operation is effective, but not covert. In some cases it may be desirable to covertly and autonomously bury a sensor array.

In view of the above, it is an object of the present invention to provide an autonomous underwater plow that has its own propulsion source. It is another object of the present invention to provide an autonomous underwater plow that can deploy a cable without requiring the assistance of an operator or a support ship. Yet another object of the present invention to provide an autonomous underwater plow that can overcome obstacles on the ocean floor as it deploys a cable payload. Still another object of the present invention to provide an autonomous underwater plow that is easy to assemble in a cost-effective manner. An object of the present invention is to provide an autonomous underwater plow that can deploy a cable payload in the ocean floor by burying the cable but leaving the sensors on the surface of the ocean floor. Another object of the present invention to provide an autonomous underwater plow that can covertly deploy a cable payload without being observed from the water surface.

SUMMARY OF THE INVENTION

An underwater plow having an improved plow assembly, and methods for using to plow to bury a cable payload according to several embodiments of the present invention, can include a plow assembly that is attached to the plow end of a frame. The frame defines a longitudinal axis for the plow, and the plow assembly can include a blade portion that defines a blade trough. The blade portion extends downwardly below a horizontal plane that is coincident with the longitudinal axis. The plow assembly can further include a chute portion that extends upwardly above the same horizontal reference plane.

The plow assembly can further include a depressor arm that is pivotably attached to the blade portion. The depressor arm can be biased with a torsion spring so that it contacts the surface of the trough. The distal end of the depressor arm is formed with a groove that is sized to allow the cable to pass through the groove while the depressor arm is in contact with the trough, but not the sensors. As the array payload is deployed, the depressor arm pivots to allow the sensors to pass. The sensors are routed upward and pass through the chute portion, instead of downward through the blade portion of the plow assembly.

The plow according to several embodiments can further include a semi-cylindrical frame that defines a storage space for transport of the payload. A fairlead can be attached to the plow assembly between the storage space and the plow assembly to guide the payload into the plow assembly during deployment of the sensor array. A float can be pivotably attached the float end of the frame opposite from the plow assembly. The float establishes a buoyancy force $F_B$ that is less than the overall weight W of the plow, but that is sufficient to lift the float end of the frame when the plow assembly is in contact with the ocean floor so that the plow is suspended in the water at the float end. This establishes a rake angle β between the longitudinal axis for the plow and the ocean floor. With this configuration, less power is required to move the plow along the ocean to deploy the payload, because a portion of the plow is suspended in the water.

To provide propulsion for the underwater plow, the methods for burying a cable using the plow can include the step of providing a propulsion force $F_P$ that is perpendicular to a buoyancy force $F_B$ that is established by the float. This can be accomplished either by rigidly coupling a pair of thrusters to the float to provide autonomous propulsion for the plow, or by towing the underwater plow with a vessel.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

Figure 1:
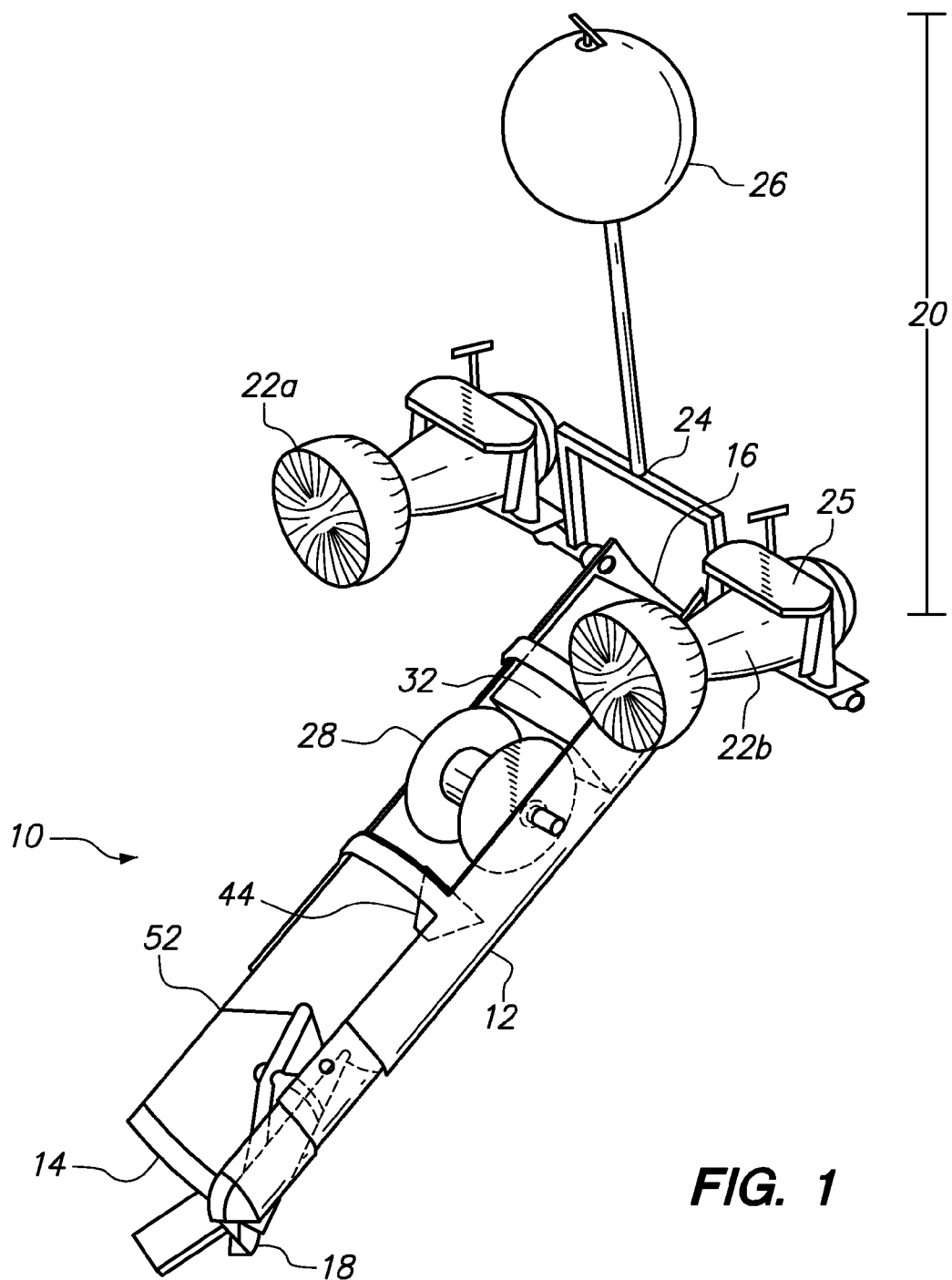
FIG. 1 is an elevational view of an underwater plow according to several embodiments of the present invention.

Referring now to the Figures, an autonomous underwater plow according to several embodiments of the present invention can be shown and generally designated by reference character 10. As shown, plow 10 can include a frame 12 having a plow end 14 and a float end 16. A plow assembly 18 can be fixed to the plow end 14, and a propulsion assembly 20 can be pivotably attached to the float end 16 of frame 12, as shown in FIGS. 1-4. Frame 12 can be formed with a semi-cylindrical configuration (although other geometric configurations could be used), which defines a storage space, and a spool 28 can be fixed to frame 12 (See FIG. 1) in the storage space for carrying a sensor-and-cable payload 30. A computer control means (CCM) 32 can also be fixed to frame 12. CCM 32 can be in communication with spool 28, with float 26 and with thrusters 22a, 22b to steer plow 10 and maintain buoyancy of plow 10 as payload 30 is deployed, in manner more fully described below.

Propulsion assembly 20 can further include a pair of thrusters 22a, 22b, that are mounted to a thruster support bar 24 with brackets 25. CCM 32 can also be in communication with thrusters 22 to thereby operate the thrusters to steer plow 10 along a predetermined course. A float 26 can further be attached to thruster support bar 24 to establish a propulsion assembly structure wherein float 26 is rigidly coupled relative to thrusters 22a, 22b. As mentioned above, the propulsion assembly is pivotably attached to frame 12. With this configuration, the propulsion assembly 20 provides a propulsion force $F_P$ that is perpendicular to the buoyancy force $F_B$ provided by float 26 when plow 10 is fully deployed, as shown in FIG. 4.

Figure 2:
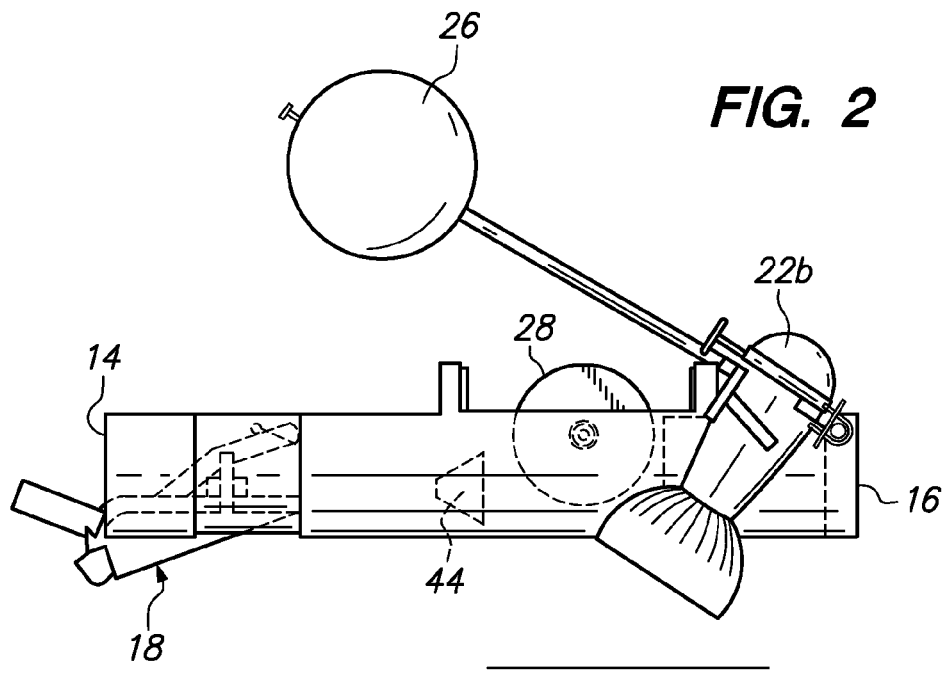
FIG. 2 is a side view of the plow of FIG. 1 while in a stowed state.
Figure 3:
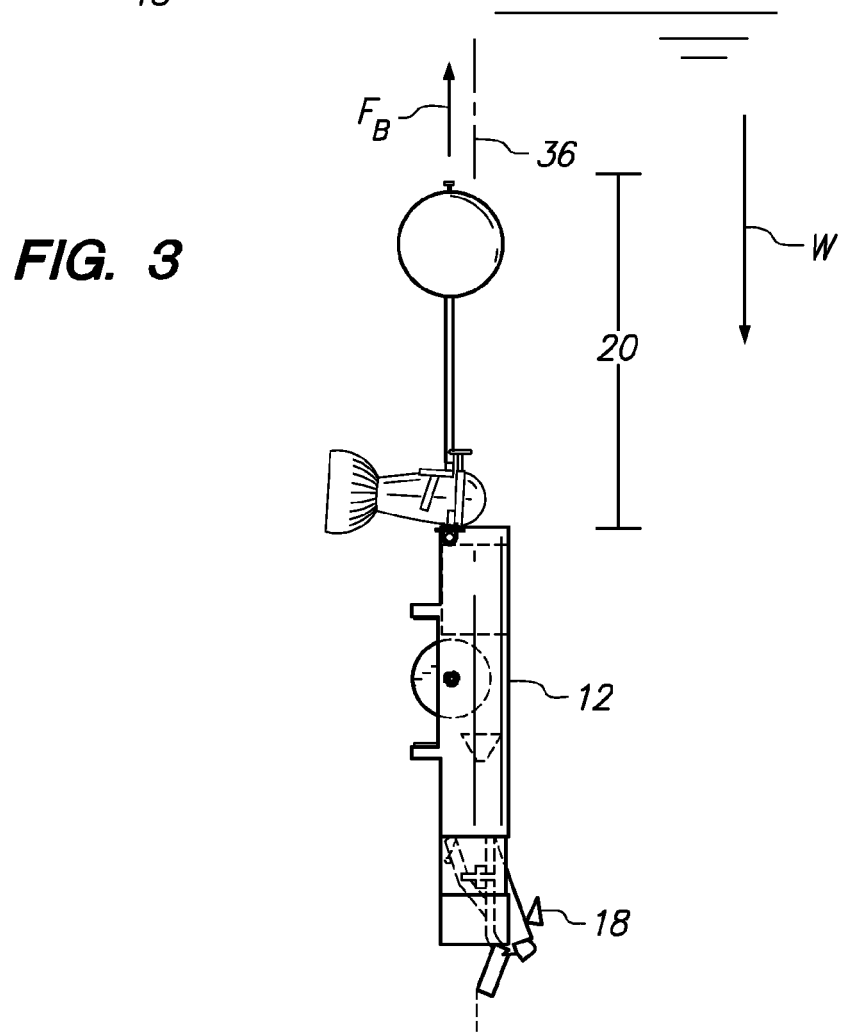
FIG. 3 is a side view of the plow of FIG. 1 after the plow has been initially deployed, while it is sinking toward the ocean floor.

The plow 10 takes up less space when it is in a stowed condition with the propulsion assembly 20 folded over the frame, as shown in FIG. 2. Once at the site where the payload 30 is to be deployed, the plow can be deposited into the water. Despite the presence of float 26, the plow 10 is made of materials that make the plow 10 negatively buoyant in sea water. Stated differently, the plow 10 is formed with materials that result in the overall weight W of the plow 10 being greater than the buoyancy force $F_B$ that is established in float 26. With this configuration, when the plow is released from the deployment vessel, it begins to sink. As the plow sinks toward the sea floor, the float 26 causes the thruster support bar 24 to pivot away from frame 12, from the stowed position to a transit position. While the plow 10 is in transit to the ocean floor, propulsion assembly 20 is aligned with a longitudinal axis 36 defined by frame 12, as shown in FIG. 3.

Figure 4:
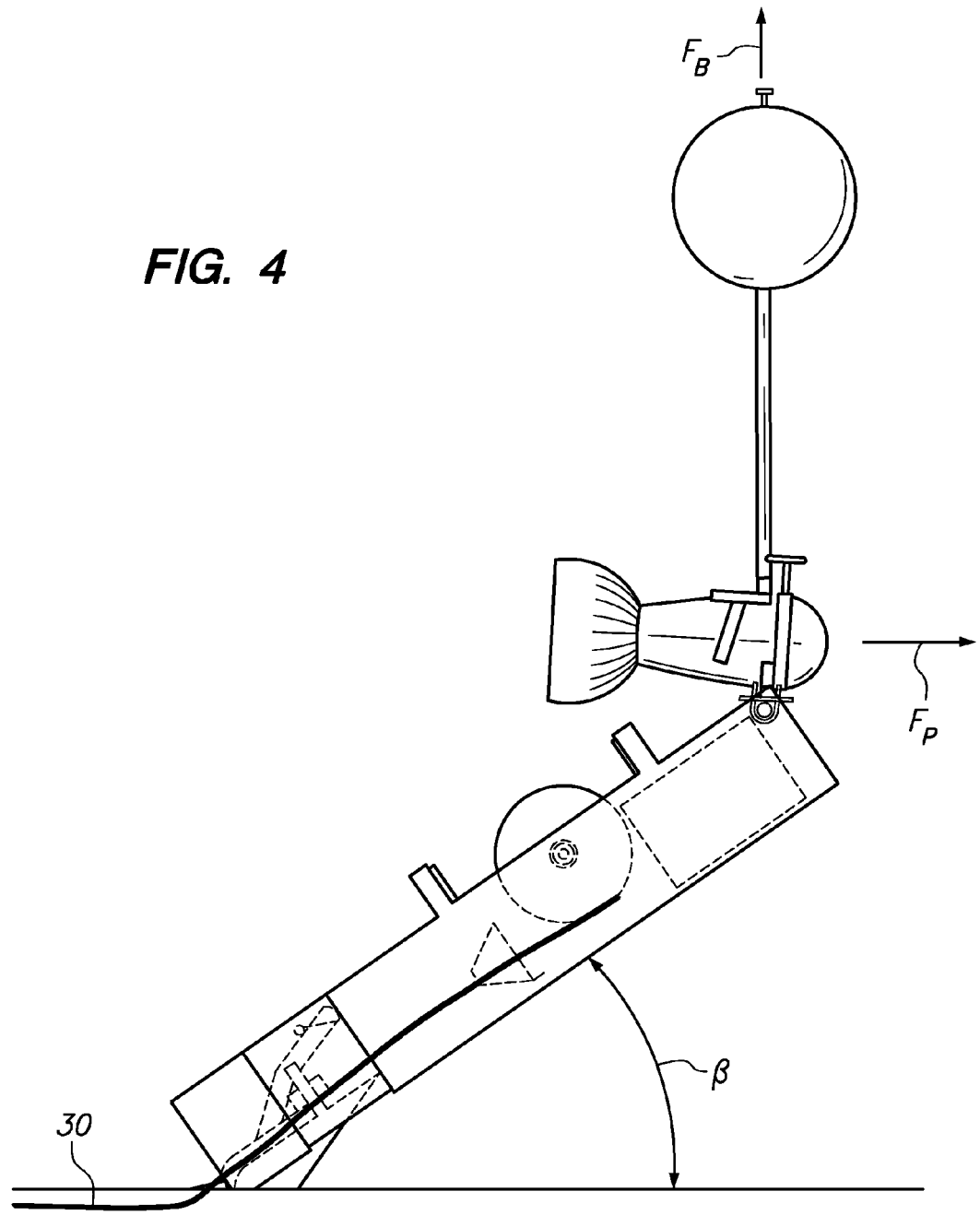
FIG. 4 is a side view of the plow of FIG. 1 with the plow fully deployed on the ocean floor.
Figure 5:
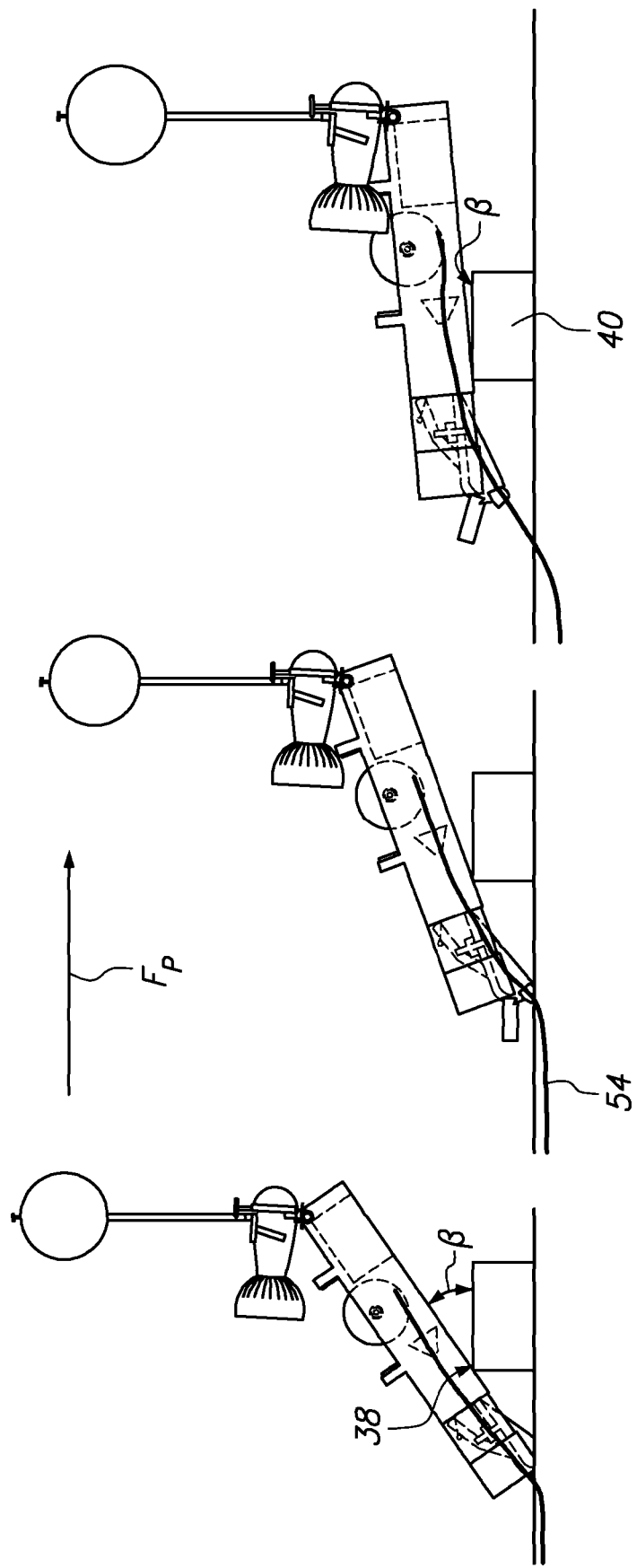
FIG. 5 is the same view of FIG. 4, which illustrates how the plow overcomes an obstacle on the ocean floor.
Figure 6:
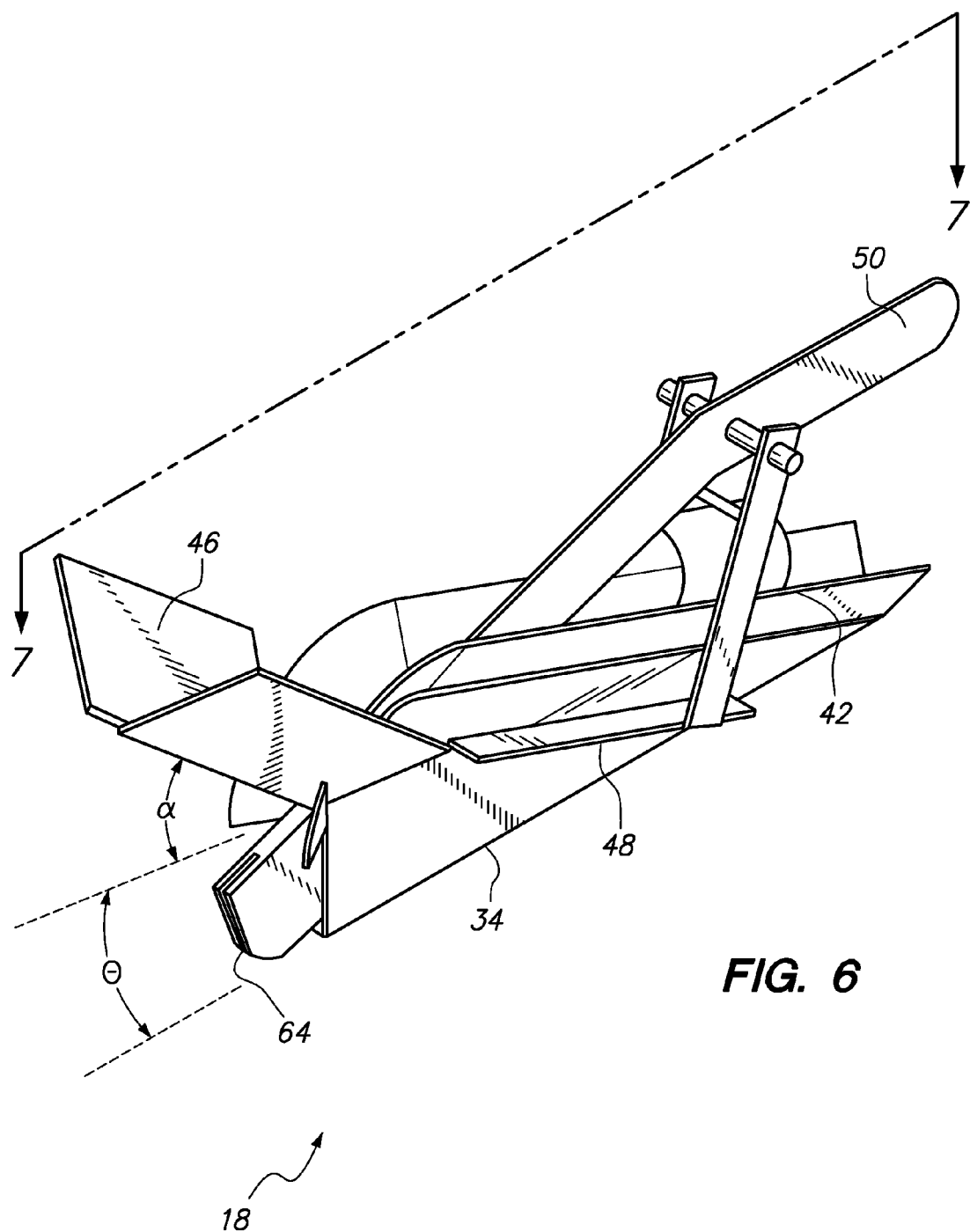
FIG. 6 is a side elevational view of the plow assembly of the plow of FIG. 5.

The plow 10 assumes a posture similar to that shown in FIGS. 4-6 during normal deployment. Once the plow assembly 18 contacts the sea floor, blade 34 of plow assembly 18 digs into the ocean floor. The float 26 provides a buoyancy force $F_B$ that is less than the weight of the plow; however, $F_B$ is sufficient to raise the float end 16 of frame 12 in a manner that establishes a rake angle β between the ocean floor and longitudinal axis 36 of frame 12, as shown in FIG. 4. The arrival of the plow on the sea floor is recognized by a computer control module (CCM) 32 that is fixed to frame 12, either by a contact switch or by other means that are known in the prior art. CCM 32 is in communication with thrusters 22a and 22b, and CCM 32 can send an activation signal to thrusters 22. Once the thrusters 22 are activated, CCM 32 maneuvers the plow 10 according to a preprogrammed heading. To do this, the CCM 32 can include an internal gyrocompass or similar type of structure incorporated therein.

If the plow encounters an obstacle during deployment, and referring primarily now to FIG. 5, the frame 12 pivots about a pivot point 38 on frame 12 where frame 12 contacts obstacle 40. As frame pivots about pivot point 38, float end 16 becomes temporarily lowered and rake angle β is temporarily decreased. This motion decreases the rake angle β of the plow assembly 18, thereby increasing the chance of clearing the obstacle. At the same time, $F_P$ remains constant in the horizontal plane. The decrease in rake angle β allow for more $F_P$ to take effect so that the invention can be more effectively dragged over the obstacle 40 solely by the horizontal propulsive force in thrusters 22, instead of having to be lifted over the obstacle by a remote support ship or the like. The underside of frame 12 can further be fabricated so that it is smooth, without any notches, seams and the like, which could catch on obstacle 40 and cause the plow to become snagged during operation.

While the float end is lowering and the frame 12 is pivoting about pivot point 38 as the plow 10 overcomes obstacle 40, the thrust $F_P$ from the thrusters 22 remains horizontal. This is because of rigid coupling between float 26 and thrusters 22 with support bar 24, and because propulsion assembly 20 pivots on frame 12, as frame 12 pivots on pivot point 38 of obstacle 40. Once the plow 10 has cleared the obstacle, the float raises propulsion 26 and plow blade 34 digs back into the ocean floor to re-establish the rake angle β depicted in FIG. 4.

Figure 7:
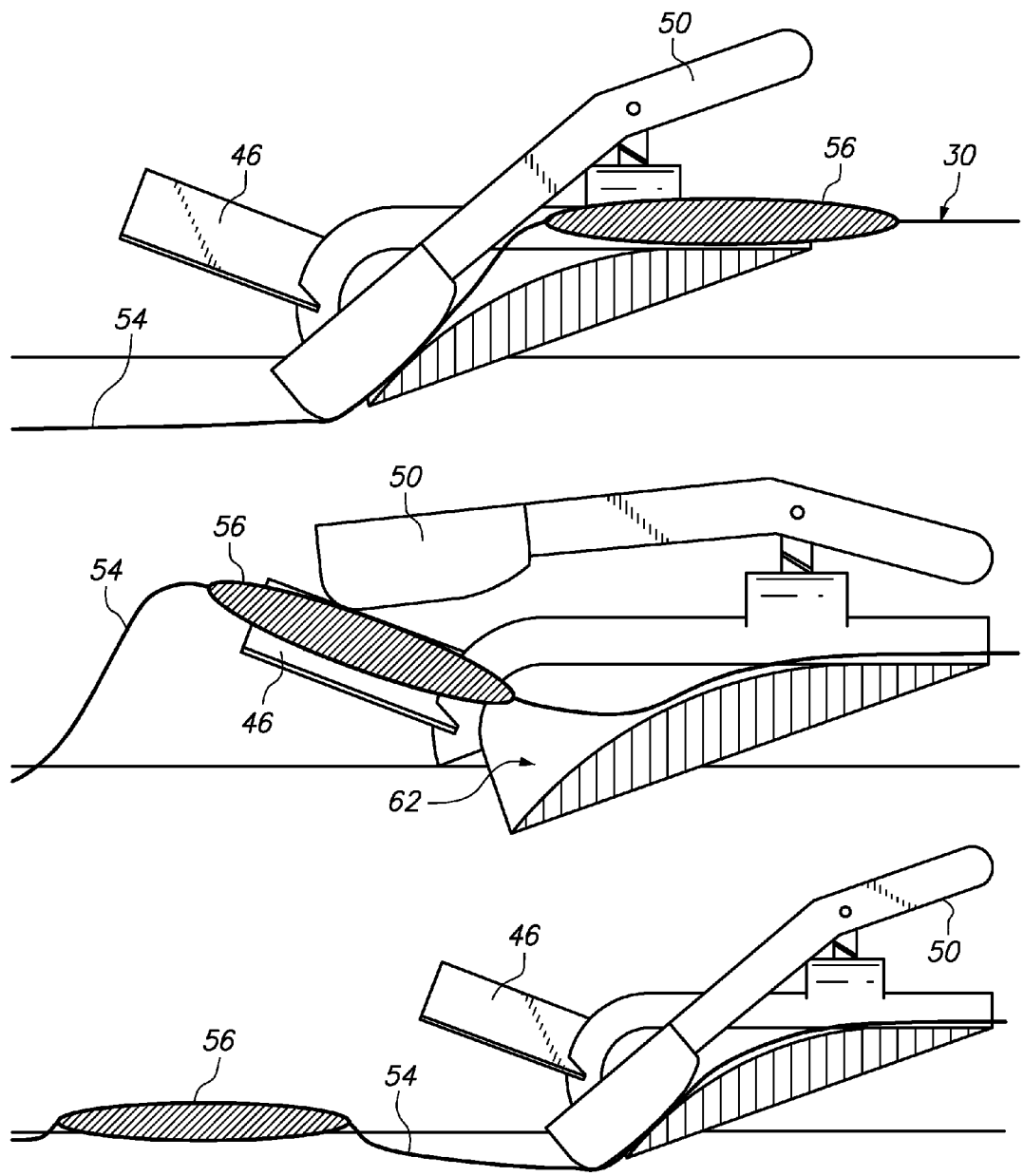
FIG. 7 is a cross-sectional view of the plow assembly of FIG. 6 taken along line 7-7 in FIG. 6, which shows the manner in which the payload is passes through the plow assembly during deployment.

Referring now to FIGS. 6-7, the plow assembly is shown in greater detail. As shown, plow assembly 18 can include horizontal edges 48, which lies in a plan that is coincident with longitudinal axis 36 when plow assembly 18 is fixed to frame 12. Horizontal edges 48 merge into a blade portion 34 that extends below the plane coincident with horizontal edges 48 by an angle θ, and a cable path 42 that is fixed to blade 34. A fairlead 44 can be fixed to the proximal end of plow assembly 18 next to path 42 (fairlead 44 is shown in FIGS. 1-2) to thread cable-and-sensor payload 30 into plow assembly 18. A sensor chute 46 can be attached to the blade 34 so that it extends upwardly from horizontal edges 48 by an angle α with the plane coincident with the aforementioned horizontal edges 48 of blade 34. A depressor arm 50 can be pivotably attached to blade 34 at horizontal edges 48. Blade 34 can define a trough 62, and depressor arm 50 can be biased with a torsion spring (not shown), or other resilient member 52 (See FIG. 1) so that depressor arm 50 rests in the blade trough 62 in contact with blade 34. Depressor arm 50 is formed with a groove 64 at its distal end, as shown in FIG. 6.

During operation of the plow 10, payload 30 is stored on the spool 28, which is fixed to frame 12 in a storage space defined by semi-cylindrical frame 12. Spool 28 has only a small amount of back tension so that payload cable 54 deploys into the trench created by the plow blade 34 as the plow is propelled forward. The payload cable 54 and payload elements 56 are aligned with the plow assembly 18 prior to entering the plow mechanism by the funnel shaped fairlead 44, which is shown in FIG. 1. This ensures the smooth flow of payload cable 54 into the plow assembly 18.

As shown in FIG. 7, the blade 34 digs into the ocean floor 66 and temporarily establishes a trench in the floor as the plow operates. As payload 30 is threaded into plow assembly 18, cable 54 of payload 30 is threaded into the blade trough and exits the blade through groove 64 while blade 34 is in contact with the trough, where causes cable 54 to become buried as the trench dug by blade 34 fills back in. When a sensor element 56 is encountered, however, the element is too wide to pass through groove 64.

Instead of passing through the groove 64 and being buried in the trench established by blade 34, the sensor element 56 is urged upward from the horizontal plane into the sensor chute 46. As the element 56 is urged upward, it forces the plow depressor arm 50 to pivot outwardly and away from the blade trough 62. The depressor arm 50 pivots and allows the sensor element 56 to slide past depressor arm 50 and become directed upward towards sensor chute 46, where the sensor is deposited on the ocean floor after exiting chute 46. When the sensor has passed through the plow assembly, the pivot arm is compelled by spring tension back to its biased position in contact with trough 62, to direct the cable 54 back into the bottom of the plow trough, where it becomes buried when the trench fills back in after the blade 34 passes through the ocean floor. With this configuration, the cable 54 of payload 30 becomes buried during operation of the undersea plow according to several embodiments.

Figure 8:
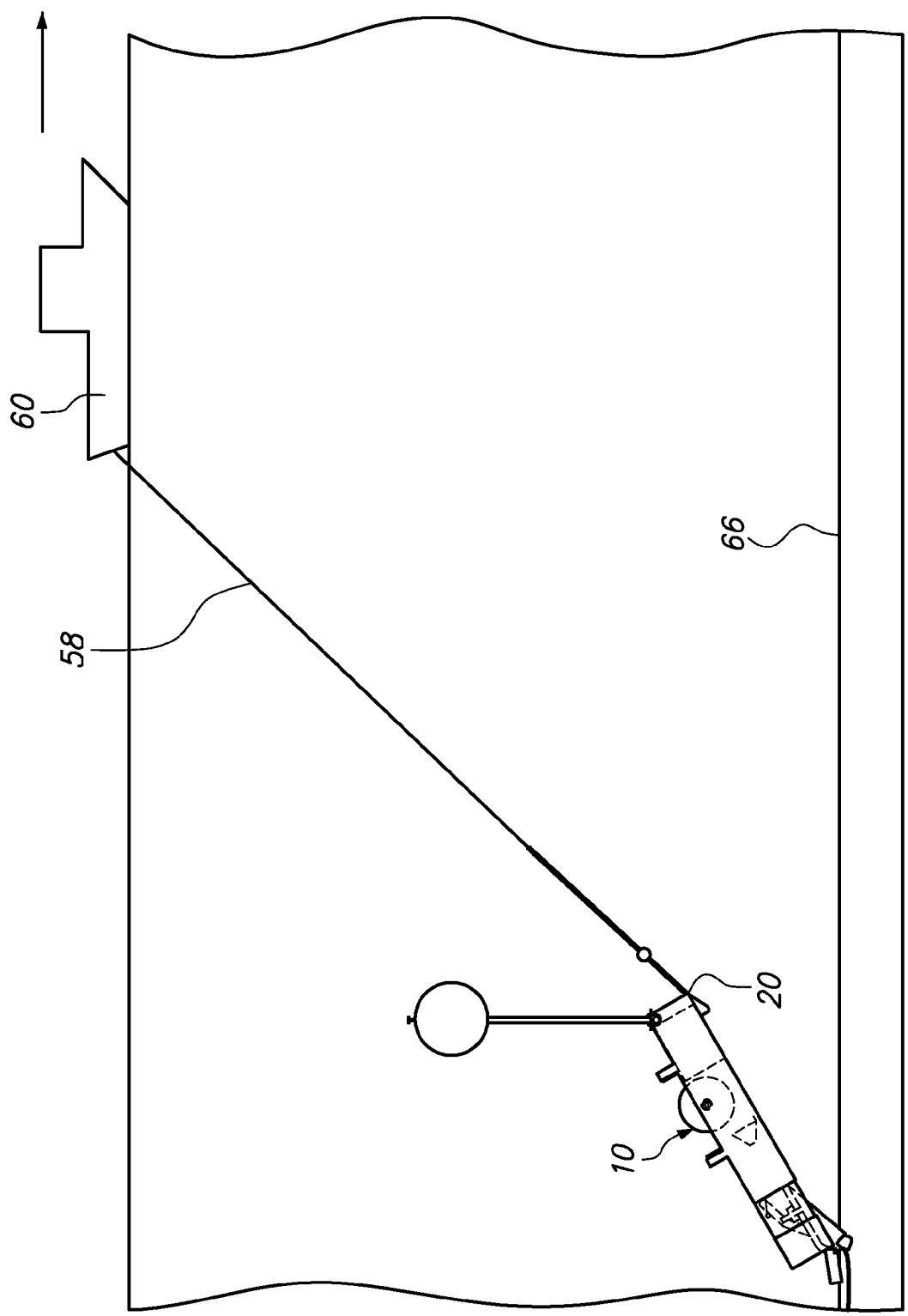
FIG. 8 is a diagram that illustrates how a plow according to several alternative embodiments could be propelled by being towed by a vessel; and, FIG. 9 is a block diagram that is illustrative of steps that can be taken to practice the methods according to several embodiments of the invention.

Referring now to FIG. 8, an alternative embodiment of the invention is shown. As shown, for some heavy duty applications that include a large payload, or a heavy duty frame 12 that can withstand environmental conditions, it may be desirable to provide additional power to propel the plow 10. For these conditions, the plow 10 can be connected to a surface vessel 60 via towing cable 58 to move the plow in the direction desired by the user. The vessel can either supplement the aforementioned thrusters 22, or it can be used in lieu of the thrusters 22 to provide propulsion force $F_P$ to move the plow 10.

Figure 9:
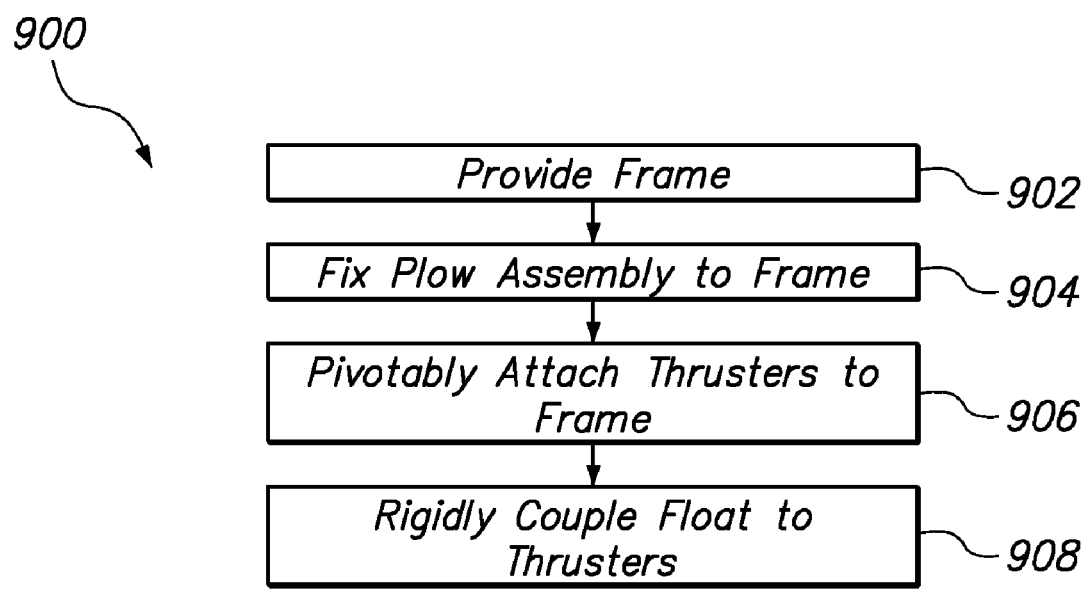

Referring now to FIG. 9, a block diagram is shown that is illustrative of steps that can be taken to practice the methods of the invention according to several embodiments. As shown in FIG. 9, the steps taken can include the step of providing a plow frame, as illustrated by step 902. The plow frame can have a plow and a float end, and the methods can further include the step of fixing a plow assembly to the plow end, as shown by block 904 in FIG. 9. To propel the underwater plow, a propulsion means (such as thrusters 22, for example) can be pivotably attached to the float end of frame 12, as shown by block 906 in FIG. 9. Additionally, the methods can include the step of rigidly coupling a float to the propulsion means, as shown by step 908 in FIG. 9. The rigid coupling of the float and propulsion means, combined with the pivoted coupling of the propulsion means and frame, allows for operation of the plow 10 as described above. The methods can further include the step of controlling the propulsion assembly to steer the plow 10 on a predetermined course. This can be accomplished by placing an internal gyrocompass in the computer control module 32 that is attached to frame 12 as described above.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of any ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An underwater plow having negative buoyancy so that said underwater plow sinks when said underwater plow is placed in water, said underwater plow further comprising:
   a frame having a plow end and a float end;
   a plow assembly attached to said plow end;
   a propulsion assembly attached to said float end, said propulsion assembly providing a propulsion force $F_P$ in the horizontal plane;
   said propulsion assembly having at least one float and at least one propulsion means that is rigidly coupled to said float, said float providing sufficient buoyancy so that said frame establishes a rake angle $\beta$ with an ocean floor when said plow end contacts said ocean floor; and,
   said propulsion assembly and said frame connected at a pivot point such that when said underwater plow contacts an obstacle on said ocean floor, said frame pivots about said pivot point and decreases said rake angle $\beta$ during application of said propulsion force $F_P$ until said plow end slides across said obstacle.

2. The plow of claim 1 further comprising a means for controlling said propulsion assembly to steer said plow according to a predetermined course.

3. The plow of claim 1 wherein said frame is semi-cylindrical and defines a storage space for a payload, and further comprising:
   a buoyancy control means attached to said frame, said buoyancy control means varying the buoyancy of said float to maintain said rake angle while said payload is deployed.

4. A method for using an autonomous underwater plow, said method comprising the steps of:
   A) providing a frame having a plow end and a float end;
   B) fixing a plow assembly to said plow end;
   C) attaching a propulsion means to said float end;
   D) providing a propulsion force $F_P$ with said propulsion means in the horizontal plane;
   E) rigidly coupling a float to said propulsion means, said float having sufficient buoyancy so that when said plow end of said frame contacts an ocean floor, said frame establishes a rake angle $\beta$ with said ocean floor; and,
   said propulsion means and said frame connected at a pivot point such that when said underwater plow contacts an obstacle on said ocean floor during the accomplishment of said steps D) and E), said frame pivots about said pivot point and decreases said rake angle β during accomplishment of said steps D) and E) until said plow slides across said obstacle.

5. The method of claim 4, further comprising the step of:
F) controlling said propulsion assembly to steer said plow in a predetermined course.

6. The method of claim 5 wherein said frame defines a storage space for a cable, and further comprising the step of:
G) staging said cable in said storage space; and,
H) varying the buoyancy of said float to maintain said rake angle as said cable is deployed.

7. The method of claim 6, wherein said step F) and said step H) are accomplished with a computer control means attached to said frame, said computer control means in communication with said float and said propulsion means.

* * * * *